July 28, 1931.  H. FORD  1,816,216
AIRPLANE
Filed May 21, 1930  4 Sheets-Sheet 3
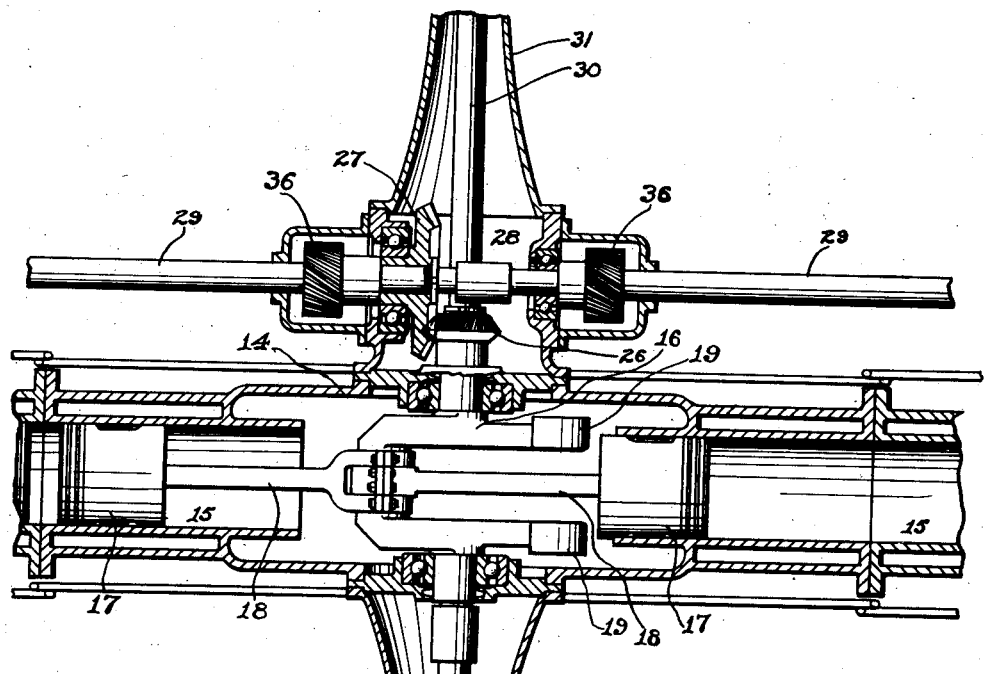
Fig. 5
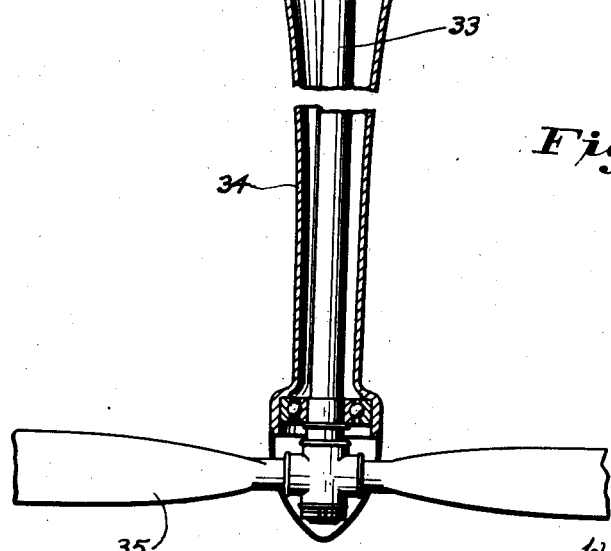
INVENTOR.
Henry Ford.
BY
ATTORNEY.

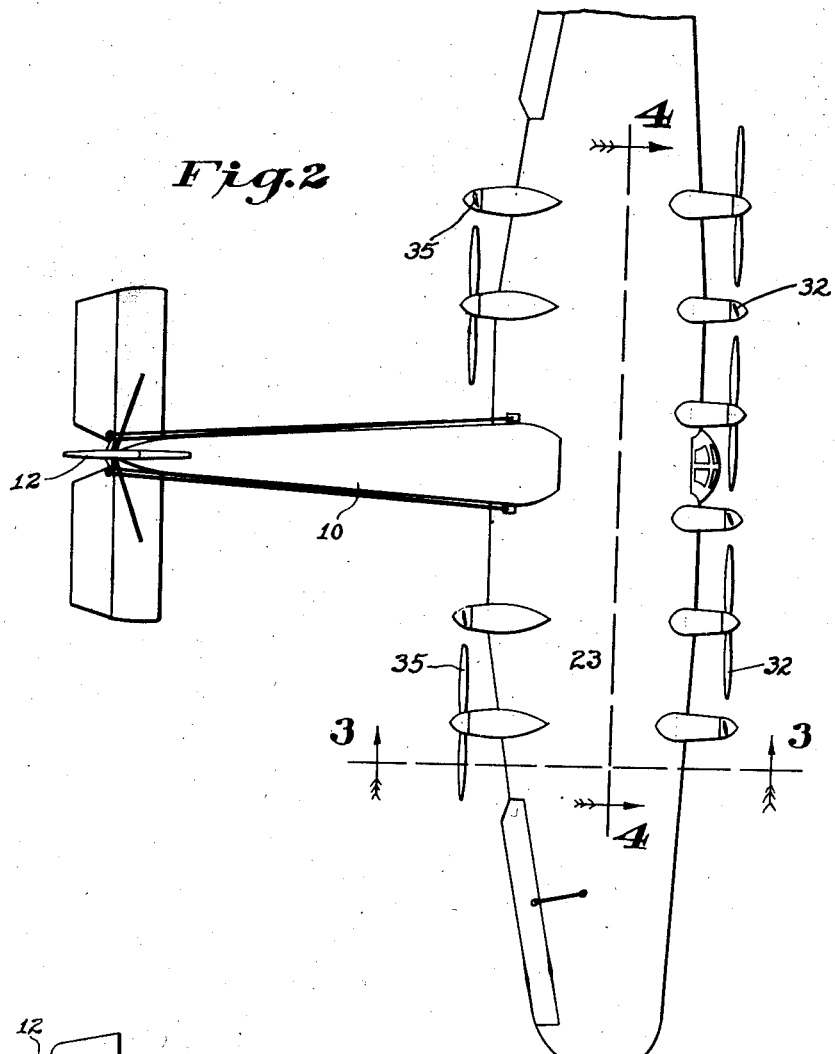
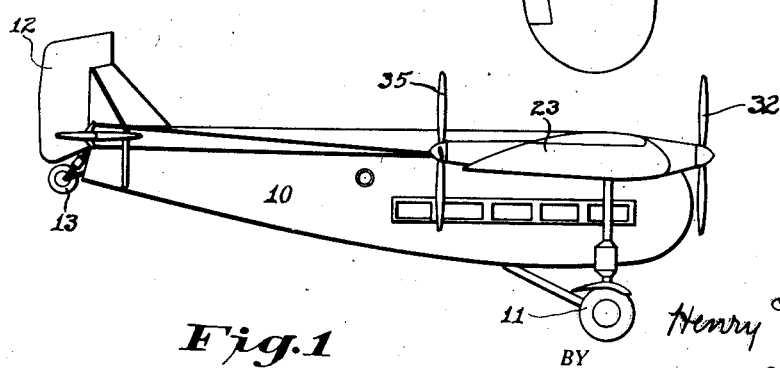

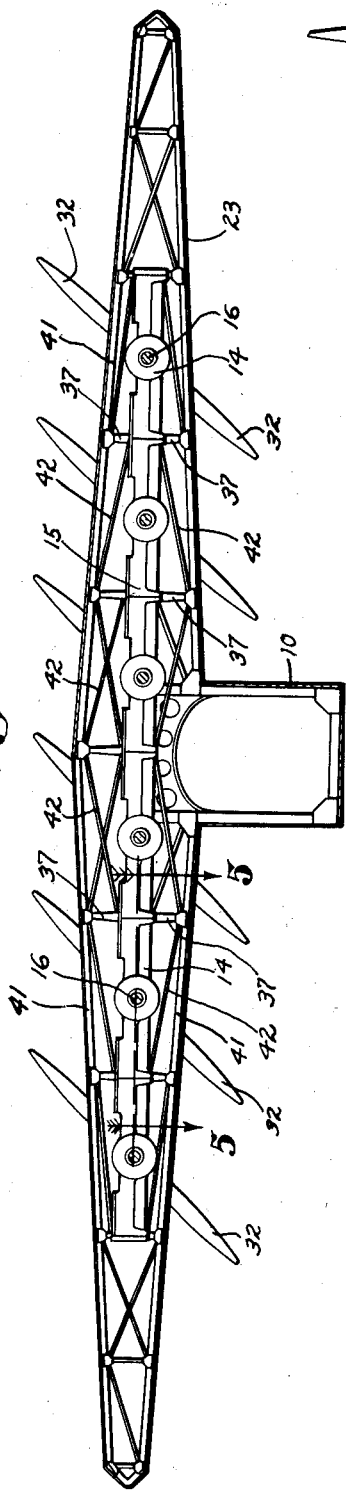

July 28, 1931.  H. FORD  1,816,216
AIRPLANE
Filed May 21, 1930  4 Sheets-Sheet 4

INVENTOR.
Henry Ford.
BY
ATTORNEY.

Patented July 28, 1931

1,816,216

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

AIRPLANE

Application filed May 21, 1930. Serial No. 454,453.

The object of my invention is to provide an airplane especially adapted for transport use.

A further object of my invention is to provide an airplane having an engine adapted to be installed within the lines of the airplane wings so that the wind resistance of the airplane may be materially lessened.

Still a further object of my invention is to provide an airplane engine so constructed that it forms one of the wing struts. Heretofore, when mounting airplane engines, either in or on the wings it has been necessary to truss these wings to support the weight of the engines. In my improved airplane the structural strength of the airplane engine is utilized to brace the wings so that at least one wing spar may be eliminated to thereby lighten the device.

Still a further object of this invention is to provide an airplane engine so designed that its weight is uniformly distributed within the major portion of the wing section so that wing strains due to the localization of the engine weight will be eliminated. The engine weight being uniformly distributed along the wing section adjacent to the uniform lifting surface of the wings, practically no bending strains are induced in these wings so that their structure may be materially lightened.

The reduced bending stresses in these wings allow the engine frame to be used as the wing truss so that it is unnecessary to provide a stronger frame for this purpose than is normally required by the engine. The combining of the engine frame and wing truss materially lightens the structure, and as the weight of the engine is better distributed relative to the lifting surface superior performance may be expected.

Still a further object of my invention is to provide an engine, as described, having a plurality of spaced crank shafts which may extend out from the airplane wing and which may have air propellers attached thereto and operated in synchronism along the major portion of the wing. If desired, these crank shafts may extend from the front to rear through the wing and have propellers secured to each end thereof.

My improved engine consists of one long cylinder extending horizontally through the major portion of the wing in which a plurality of opposed pistons are arranged to operate transverse cranks disposed at intervals through the cylinder. These cranks are directly connected with a longitudinal synchronizing shaft so that each pair of opposed pistons co-act with the adjacent portion of the cylinder to form a combustion chamber. It will be readily seen that I am able in this structure to provide a cylinder bore of a diameter approaching the thickness of the wing and am also able to provide a relatively long stroke for such bore. With this structure it is very desirable to adapt the engine to operate with the Diesel cycle thereby allowing the use of inexpensive fuels.

In connection with the ordinary airplane structure an engine of large bore and stroke would be very difficult to mount and streamline, while in my improved structure the engine is an integral part of the wing structure and is, of course, perfectly streamlined.

Still a further object of my invention is to provide a Diesel type engine having a large bore and stroke and to so mount this engine that the torque reaction and torsional recoil will be resisted entirely within the engine. Heretofore, engines of large bore and stroke, very desirable for oil burning engines, were not adaptable for airplane use because of the excessive bracing required to absorb the torque reaction and torque recoil.

This objection is overcome in my improved structure by driving each alternate crank in the opposite direction so that the reaction is balanced. The engine extending along the major portion of the wing may be readily seen to minimize the recoil action to a negligible quantity.

With these and other objects in view my invention consists in the arrangement, construction, and combination of the various parts of my improved device, as described in the specification, claimed in my claims, and illustrated in the accompanying drawings, in which:

Figure 1 shows a side elevation of an airplane constructed in accordance with the invention described herein.

Figure 2 shows a top view of the airplane shown in Figure 1.

Figure 3 shows a sectional view taken on the line 3—3 of Figure 2.

Figure 4 shows a sectional view taken on the line 4—4 of Figure 2.

Figure 5 shows a sectional view taken on the line 5—5 of Figure 4.

Figures 6, 7, 8:
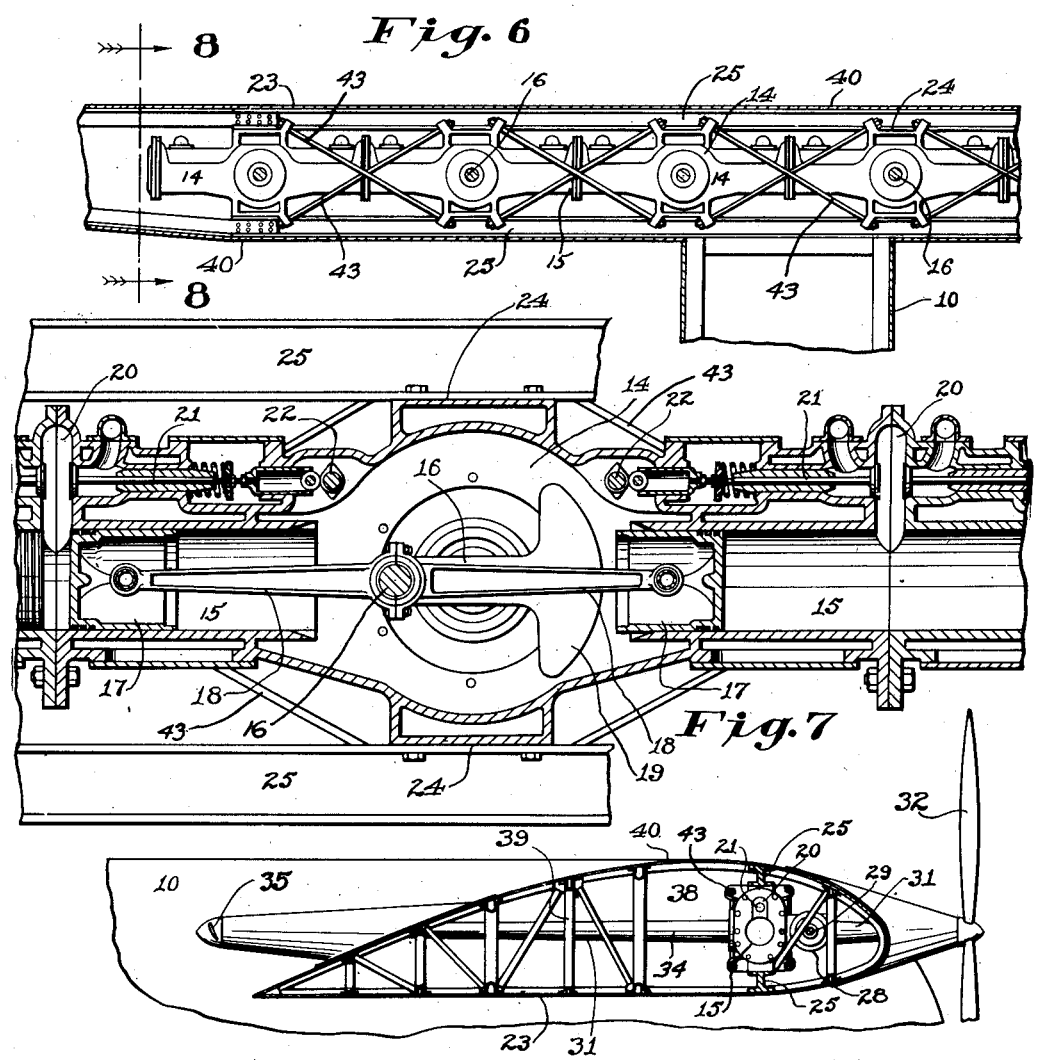
Figure 6 shows an alternate type of engine primarily adapted for an airplane wing of lesser thickness than that shown in Figure 4.
Figure 7 shows a vertical control sectional view through the engine shown in Figure 6.
Figure 8 shows a sectional view taken on the line 8—8 of Figure 6.

Referring to the accompanying drawings, I have used the reference numeral 10 to indicate generally a conventional airplane fuselage having a landing gear 11, rudder 12 and tail wheel 13. I have provided a wing 23 secured to the fuselage 10 to form a high wing monoplane type structure.

The engine used with this airplane consists of a plurality of individual units secured end to end and to a pair of side members, this assembly constituting the main spar for the wing 23. Each adjacent pair of these units operate as an opposed piston engine, which principle is illustrated and described in my Patent No. 1,749,578.

Referring to Figure 7, I have provided a crank case 14 having a pair of aligned cylinders 15 extending from each side thereof. A crank shaft 16 is rotatably mounted between these cylinders 15 and a pair of pistons 17 are connected in the ordinary manner to this crank shaft by connecting rods 18. Counterweights 19 are secured to the crank shaft to balance the throw of the crank and the connecting rods. A plurality of these cylinder and crank case units are bolted together, end to end, to form a single engine. The cylinders 15 of these units are preferably aligned and the crank shafts arranged to lay in one plane. That portion of two abutting cylinders, adjacent to the connecting joint between each pair of units, forms one of the combustion chambers 20 for the engine. Suitable valves 21 operated from transverse cam shafts 22 are provided for the admitting and exhausting of the gas of compression.

Referring to Figure 4, it will be seen that I have secured six individual engine units together. A pair of struts 37 extend outwardly from each side of each combustion chamber to position so that truss members 41 may be secured thereto. These truss members support the top and bottom of the wing and coact with the struts 37 and engine units to form a rigid wing spar. Diagonal braces 42 tie in the outer ends of the struts 37 to reinforce the engine assembly.

Referring now to Figure 6, I have shown an alternate structure wherein the ends of the individual engine units are bolted together and also the center portions or crank cases of each unit are secured directly to tie bars 25 which extend the length of the assembly. Flatted portions 24 are provided on each side of each crank case 14 which are bolted to the pair of tie bars. I have further provided tie rods 43 extending diagonally from one side of the engine to the other which help reinforce the assembly. It may thus be seen that the engines are rigidly tied together to form a single engine unit, which unit is especially adapted for relatively thin wing sections.

I prefer to assemble the wing 23 around my engine unit instead of mounting the unit in an already completed wing. This unit, as shown in Figure 3 forms the forward main spar of the wing. Directly to the rear of the unit a passageway 38 is provided so that access may be had from inside of the wing to service any of the parts, and a plurality of transverse wing ribs 39 are secured at intervals to the engine unit to support the wing covering 40 in the ordinary manner. It will thus be seen that I have eliminated the conventional wing spar and substituted my improved engine assembly therefor.

Each of the crank shafts 16 are provided with spiral bevel gear pinions 26 which mesh with bevel ring gears 27. These ring gears 27 are rotatably supported in housings 28 secured to the forward faces of the crank cases 14 and are each connected to a longitudinal timing shaft 29 rotatably mounted in the housings 28 to synchronize the several crank shafts of the device. The forward end of each crank shaft 16 is provided with an extension shaft 30 the outer end of which is rotatably mounted in a cone shaped housing 31 which extends from the crank case 14. Tractor propellers 32 are secured to these shafts so as to be directly driven by the crank shafts 16. Likewise, the rear ends of several of the crank shafts 16 are provided with extension shafts 33 the outer end of which are supported in housings 34 and to which are secured pusher propellers 35.

As the timing shaft 29 and propeller shafts 30 would normally intersect if ordinary bevel gears were used at 26 and 27, I have provided gears known as Hypoid type gears at these points so that the timing shaft 29 is disposed a considerable distance above the crank centers of the crank shafts 16. If desired spiral gears may be used herewith or a worm and worm wheel used without departing from the spirit of this invention. Such disposition of the timing shaft makes it very convenient to operate the cam shafts 22 through suitable spiral gears 36 spaced along the shafts 29 and on each cam shaft in the conventional manner.

Among the many advantages arising from the use of my improved structure it may be well to mention that the entire engine is installed within the lines of the airplane wing so as to entirely eliminate the head resistance of the engine. Further, my engine is so constructed that it forms the main spar of the wing thereby lessening the cost and weight of the airplane.

Still a further advantage results in that the highly efficient double opposed principle is utilized in the engine so that maximum efficiency may be obtained therefrom. Also, this improved type of engine having a relatively large bore and stroke is particularly adaptable for use as an oil engine, this use being further advanced for the reason that the engine torque reaction and torque recoil strains are restrained within the frame of the engine.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. In an airplane construction, the combination of a wing having a plurality of engine units secured therein, said units being secured together to form an elongated engine assembly which acts as one of the spars of said wing.

2. In an airplane construction, a wing spar consisting of a plurality of opposed piston engines secured together end to end.

3. In an airplane construction, a wing, an engine extending longitudinally within a portion of the wing, a cylinder extending longitudinally through said engine, a plurality of transverse crank shafts spaced along said cylinder, and a pair of pistons connected to each crank disposed in the adjacent portion of the cylinder co-acting with the pistons on either side to form a multiple cylinder opposed piston engine.

4. In an airplane construction, a plurality of like castings each having a crank case formed in its central portion with a pair of aligned cylinders extending therefrom, means for securing said crank cases together end to end to form a continuous cylinder, a crank shaft in each crank case, and a timing shaft operatively connecting the crank shafts to thereby synchronize said shaft.

HENRY FORD.